June 26, 1928.
J. GLASER
1,674,969
APPARATUS FOR CUTTING ROCK, COAL, AND THE LIKE
Filed June 12, 1926
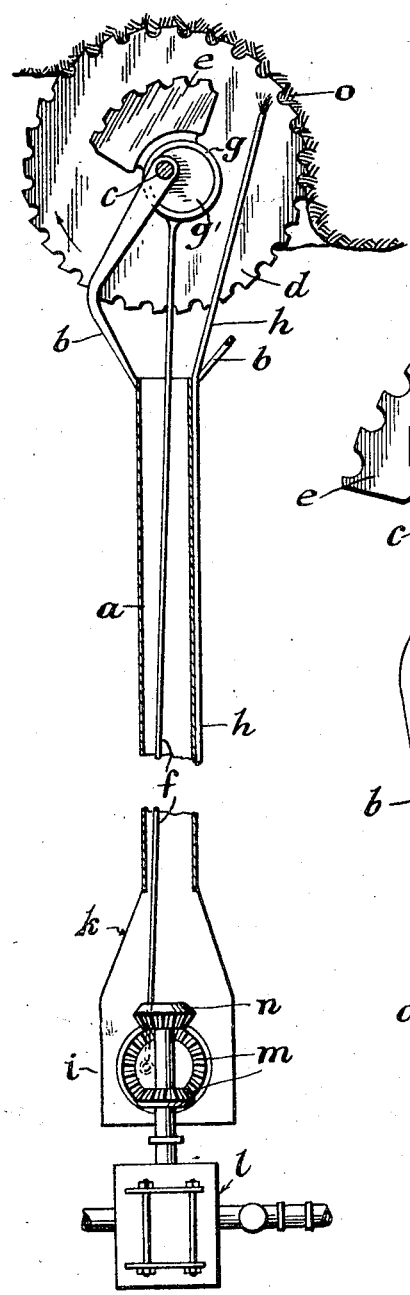
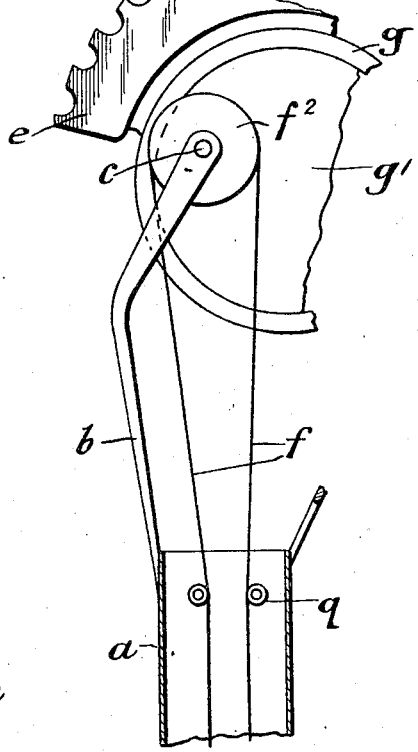
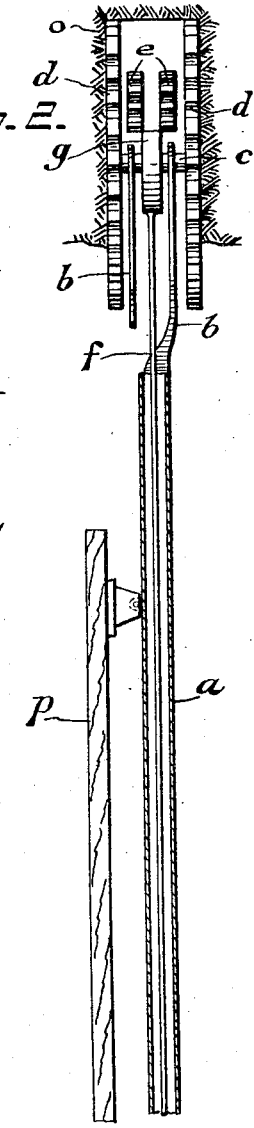
Inventor:
Jakob Glaser
Witnesses.

Patented June 26, 1928.

1,674,969

UNITED STATES PATENT OFFICE.

JAKOB GLASER, OF WALDMOHR, GERMANY.

APPARATUS FOR CUTTING ROCK, COAL, AND THE LIKE.

Application filed June 12, 1926, Serial No. 115,610, and in Germany June 26, 1926.

This invention relates to an improved apparatus for cutting rock, coal, or the like, in which a cutting head with a pair of rotary cutters is used, and the novelty consists in the provision between said rotary cutters of an eccentric cutting sector which is to periodically cut the rock between said rotary cutters and to allow an escape of the cut material when not acting upon the rock.

The accompanying drawing illustrates the improved apparatus: Figs. 1 and 2 are side views of the same at right angles to one another, while Fig. 3 shows the cutting head with a modification of its driving means.

Referring to Figs. 1 and 2: On the front end of the hollow bar $a$ of adjustable length, the cutting head of the apparatus is mounted in brackets $b$. The primary cutters $d$ are turnable with their common shaft $c$ in said brackets, the distance between said cutters being adjustable by any known means so as to vary the breadth of the cut to be provided in the rock $o$, to suit requirements. Between the primary cutters $d$ a secondary periodically acting double cutting sector $e$ is arranged and eccentrically located with reference to the primary cutters $d$ by means of an eccentric disk $g^1$ mounted on the shaft $c$ and encircled by the annular supporting frame $g$ of said cutting sector $e$. The latter forms the head of a connection-rod $f$ arranged in the hollow bar $a$ and the rear end of which is eccentrically connected with a bevel-gearing $m$.

Driving is effected by means of a compressed-air engine $l$ in gear with the bevel-gearing $m$, the rotary direction being reversible by the provision of a third bevel-wheel $n$.

The driving-gear is enclosed by a casing $i$ connected at $k$ with the hollow bar $a$.

A cooling-water pipe leads along the hollow bar $a$ to the cutting head of the apparatus.

During its working, particularly when starting the work, the apparatus can be supported by a board $p$ (Fig. 2).

As shown in Fig. 3, instead of the connection-rod $f$, an endless driving member $f^1$ can be used, which is led over a driving-disc $f^2$ on the shaft $c$ and guided over rollers $q$ in the hollow bar $a$.

What I claim, is:—

In an apparatus for cutting rock, coal, or the like, the combination with a pair of rotary primary cutters, a common shaft for the latter, a secondary periodically acting double cutting sector eccentrically located with reference to and between said primary cutters on said shaft, and means to commonly drive said cutters and said double cutting sector.

In testimony whereof I have hereunto set my hand.

JAKOB GLASER.